United States Patent
D'Cruz et al.

(10) Patent No.: US 9,469,753 B2
(45) Date of Patent: Oct. 18, 2016

(54) PROPYLENE COPOLYMERS IN ELASTOMERIC COMPOSITIONS

(71) Applicant: ExxonMobil Chemical Patents Inc., Baytown, TX (US)

(72) Inventors: Bernard D'Cruz, Houston, TX (US); Sunny Jacob, Seabrook, TX (US); Michael Brendan Rodgers, Seabrook, TX (US); Nitin Kamalakar Tambe, Whitefield Bangalore (IN)

(73) Assignee: ExxonMobil Chemical Patents Inc., Baytown, TX (US)

( * ) Notice: Subject to any disclaimer, the term of this patent is extended or adjusted under 35 U.S.C. 154(b) by 476 days.

(21) Appl. No.: 13/947,905

(22) Filed: Jul. 22, 2013

(65) Prior Publication Data

US 2015/0021816 A1    Jan. 22, 2015

(51) Int. Cl.
   *C08K 3/34* (2006.01)
   *C08L 15/02* (2006.01)
   *B60C 1/00* (2006.01)

(52) U.S. Cl.
   CPC .............. *C08L 15/02* (2013.01); *B60C 1/0008* (2013.04); *B60C 1/0025* (2013.04)

(58) Field of Classification Search
   CPC .............................. C08L 15/02; B29D 30/00
   USPC ........................................................ 524/493
   See application file for complete search history.

(56) References Cited

U.S. PATENT DOCUMENTS

| | | | |
|---|---|---|---|
| 3,968,076 A * | 7/1976 | Gessler | C08L 23/22 524/526 |
| 4,068,051 A | 1/1978 | Baldwin et al. | |
| 4,474,924 A | 10/1984 | Powers et al. | |
| 5,071,913 A | 12/1991 | Powers et al. | |
| 5,162,425 A | 11/1992 | Sandstrom et al. | |
| 5,182,333 A | 1/1993 | Powers et al. | |
| 5,198,401 A | 3/1993 | Turner et al. | |
| 5,504,172 A | 4/1996 | Imuta et al. | |
| 5,532,312 A | 7/1996 | Gursky et al. | |
| 6,326,433 B1 * | 12/2001 | Wang | B60C 1/0008 525/191 |
| 6,525,157 B2 * | 2/2003 | Cozewith | C08F 210/06 526/160 |
| 6,881,800 B2 | 4/2005 | Friedersdorf | |
| 6,960,635 B2 | 11/2005 | Stevens et al. | |
| 7,781,530 B2 * | 8/2010 | Wang | C08L 23/22 428/35.7 |
| 8,026,323 B2 | 9/2011 | Datta et al. | |
| 2008/0249211 A1 * | 10/2008 | Smink | C08J 3/226 523/351 |
| 2009/0005509 A1 | 1/2009 | Jacob et al. | |

FOREIGN PATENT DOCUMENTS

| | | |
|---|---|---|
| WO | 00/69966 | 11/2000 |
| WO | WO 2004/058827 | 7/2004 |
| WO | WO 2004/058828 | 7/2004 |
| WO | 2006/083505 | 8/2006 |
| WO | WO 2008/027589 | 3/2008 |
| WO | WO 2011/089083 | 7/2011 |

OTHER PUBLICATIONS

Wheeler and Willis, Applied Spectroscopy, 1993, vol. 47, pp. 1128-1130.

* cited by examiner

*Primary Examiner* — Hui Chin
(74) *Attorney, Agent, or Firm* — Nancy T Krawczyk

(57) ABSTRACT

Disclosed is an ethylene-propylene copolymer having isotactic polypropylene crystallinity compounded with a halobutyl rubber in an amount effective to improve one or more of aged tensile strength retention, fatigue resistance, and dimensional stability. Also disclosed is an elastomer composition wherein the copolymer can have at least 60 wt % propylene-derived units and at least 6 wt % ethylene-derived units, and a tire inner tube or tire innerliner composition comprising from 1 to 10 phr copolymer. Also disclosed is a vulcanizate of the elastomer composition, and articles, tire innerliners, tires, and tire inner tubes comprising the vulcanizate. Further disclosed are processes for making molded articles, tire inner tubes and tires.

17 Claims, No Drawings

PROPYLENE COPOLYMERS IN ELASTOMERIC COMPOSITIONS

FIELD OF THE INVENTION

The present invention relates to elastomeric compositions that can have improvements in green strength and/or dimensional stability while processing and in fatigue life and/or crack growth resistance in the cured elastomer, to vulcanizates and articles made from such compositions, and also to processes for compounding, molding and/or curing the compositions.

BACKGROUND OF THE INVENTION

Processing is one of the major challenges faced by the rubber industry in the preparation of blends and final products. Processing includes the mixing of ingredients, the preparation of homogeneous blends, and the incorporation of fillers and other rubber chemicals in an effective and efficient method, as well as the forming of profiles, assembly of these profiles and preparation of the final product by curing.

Processing aids are ingredients incorporated into the rubber compound to enhance processing of rubber compounds. Useful processing aids minimize or overcome one or more problems associated with the product fabrication, while maintaining or improving the product performance. Some known processing aids however, even when used in amounts beneficial to the processing of elastomers, such as halobutyl rubbers including bromobutyl and chlorobutyl, can deteriorate the aging and fatigue properties. The industry has a continuing need for processing aid improvements, particularly for halobutyl rubber; such processing aids desirably would improve the aging and fatigue properties and dimensional stability, or at least do not significantly deteriorate these properties when added to improve processing.

The tire industry is the major rubber industry that consumes large volumes of specialized halobutyl based compounds. One concern of the tire industry is the preparation of dimensionally stable profiles, and compounds with good mechanical properties and good fatigue properties. The tire industry uses processing aids to facilitate the compounding of the rubber formulations and preparation of dimensionally stable profiles. Another important requirement of the rubber compound is its aging resistance, e.g., the compounds are designed to have good fatigue resistance and cut growth resistance. Many conventional processing aids improve the processing, but may reduce the performance properties such as aging resistance.

SUMMARY OF THE INVENTION

A process is provided to compound a halogenated butyl rubber composition having an increased Mooney Scorch value, one or more improved aged fatigue properties, original mechanical properties that are not substantially worse, improved dimensional stability of profiles, and one or more of improved aged mechanical properties and improved aged crack growth rates.

Disclosed herein is a composition comprising halobutyl rubber composition, from 1 phr up to 10 phr of a saturated ethylene-propylene polymer compatible with the halobutyl rubber, and a cure system. The ethylene-propylene polymer has at least 60 wt % propylene-derived units, and at least 6 wt % ethylene-derived units, based on the total weight of the polymer. The polymer has isotactic polypropylene crystallinity, a melting point equal to or less than 110° C., and a heat of fusion, as measured by DSC, of from 5 J/g to 50 J/g.

The ethylene-propylene polymer useful as a processing aid in the halobutyl composition may have any one or multiple of the following aspects: the polymer comprises 75 to 94 wt % of propylene-derived units; the polymer comprises 6 to 30 wt % of ethylene derived units; the polymer has an isotactic propylene triad tacticity of from 65 to 95%; or the polymer has a tacticity index of from 6 to 8.

In any embodiment of the invention, the elastomeric compound may contain 3 to 6 phr of the ethylene-propylene polymer.

The ethylene-propylene copolymer may be a useful processing aid in any halogenated butyl type polymer. Exemplified herein is the use of such copolymers in both bromobutyl compositions and chlorobutyl compositions.

The composition may further comprise at least one of a filler, chemical protectant, or additional processing aids. The filler may be a conventional carbon black, silica, precipitated silica, layered platy filler or any combination thereof. Chemical protectants may include waxes, antioxidants, antiozonants, and combinations thereof. Additional processing aids (in addition to the ethylene-propylene copolymer) include processing oils, resins, or a combination thereof.

In any embodiment, the cure system of the elastomeric composition may comprise less than 2 phr sulphur, or it may contain a metal oxide. In any embodiment, the cure system may contain from 1 to 5 phr zinc oxide, from 0.4 to 0.8 phr sulfur and from 2 to 5 phr accelerators.

Also disclosed herein is a process for compounding the halobutyl rubber composition, forming a green (a.k.a uncured) mixture; molding the green mixture to form a green article; and curing the green article to form a cured article.

DETAILED DESCRIPTION

To improve both the processing properties of a rubber composition, while maintaining or improving the final characteristics of the article comprising the rubber composition, the present invention is directed to the inclusion of compounds useful as processing aids for a rubber composition wherein the processing aid is selected based upon its physical structure and the amount into which it is added to the blended rubber composition.

The present invention uses an ethylene-propylene copolymer having isotactic polypropylene crystallinity as a compounding additive in a halobutyl rubber blend to improve one or more of Mooney viscosity, Mooney scorch, shrinkage (i.e., better long term dimensional stability of the produced article), aged mechanical and fatigue properties, original and aged crack growth properties, and/or the like, and in embodiments, without adverse impact on original, unaged mechanical properties. When the composition is used in a tire innerliner or inner tube according to embodiments, the composition can improve the obtained properties of the manufactured article as well as benefit the fabrication process. For example, there may be embodiments wherein splicing is facilitated or wherein product molding is improved due to a more uniform compound flow, and so on.

Broadly, one embodiment provides an elastomer composition comprising a blend of a halobutyl rubber, a cure system and an ethylene-propylene copolymer having isotactic polypropylene crystallinity. Other embodiments provide a vulcanizate obtained by curing the elastomer composition, and articles comprising the vulcanizate, such as, for example, tire innerliners and tire inner tubes. In another embodiment, a process for making a molded article comprises melt mixing the elastomeric composition, shaping the mixture into a green article and curing the green article to vulcanize the halobutyl rubber.

Definitions and Test Methods

Polymer is used herein to refer to homopolymers, copolymers, interpolymers, terpolymers, etc. For ease of reference in this disclosure, a copolymer may refer to a polymer comprising at least two monomers, optionally with other monomers. When a polymer is referred to as comprising a monomer or comonomer, the monomer is present in the polymer in the polymerized form of the monomer or in the derivative form of the monomer; the polymer is derived from the identified monomer(s). For ease of reference the phrase comprising the (respective) monomer or the like may be used as shorthand. Likewise, when catalyst components are described as comprising neutral stable forms of the components, it is well understood by one skilled in the art, that the ionic form of the component is the form that reacts with the monomers to produce polymers.

The comonomer content and sequence distribution of the polymers can be measured using $^{13}C$ nuclear magnetic resonance (NMR) by methods well known to those skilled in the art. Comonomer content of discrete molecular weight ranges can be measured using methods well known to those skilled in the art, including Fourier Transform Infrared Spectroscopy (FTIR) in conjunction with samples by GPC, as described in Wheeler and Willis, Applied Spectroscopy, 1993, vol. 47, pp. 1128-1130.

In the particular case of ethylene-propylene copolymers containing greater than 75 wt % propylene, the comonomer content can be measured as follows. A thin homogeneous film is pressed at a temperature of about 150° C. or greater, and mounted on a Perkin Elmer PE 1760 infrared spectrophotometer. A full spectrum of the sample from 600 cm$^{-1}$ to 4000 cm$^{-1}$ is recorded and the monomer weight percent of ethylene can be calculated according to the following equation: Ethylene wt %=82.585−111.987X+30.045X$^2$, where X is the ratio of the peak height at 1155 cm$^{-1}$ and peak height at either 722 cm$^{-1}$ or 732 cm$^{-1}$, whichever is higher.

A saturated polymer, copolymer or elastomer is one that is free of or comprises less than 0.1% olefinic hydrogens, based on the total hydrogen atoms in the polymer. In some embodiments, the saturated polymer may comprise less than 0.01% or less than 0.005% olefinic hydrogen atoms. Several procedures such as iodine number and the determination of the olefin content by H$^1$ or $^{13}C$ nuclear magnetic resonance (NMR) have been established.

Rubber refers to any polymer or composition of polymers consistent with the ASTM D1566 definition: "a material that is capable of recovering from large deformations, and can be, or already is, modified to a state in which it is essentially insoluble (but can swell) in boiling solvent . . . ." Elastomer is a term that may be used interchangeably with the term rubber.

Elastomeric composition refers to any composition comprising at least one elastomer as defined above.

A vulcanized rubber compound by ASTM D1566 definition refers to "a crosslinked elastic material compounded from an elastomer, susceptible to large deformations by a small force capable of rapid, forceful recovery to approximately its original dimensions and shape upon removal of the deforming force." A cured elastomeric composition refers to any elastomeric composition that has undergone a curing process and/or comprises or is produced using an effective amount of a curative or cure package, and is a term used interchangeably with the term vulcanized rubber compound.

The term phr is parts per hundred rubber by weight or "parts," and is a measure common in the art wherein components of a composition are measured relative to a total of all of the vulcanisable elastomer components other than the ethylene-propylene copolymer processing aid. The total phr or parts for all vulcanizable rubber components (including the ethylene-propylene copolymer, where it may technically be a rubber), whether one, two, three, or more different rubber components is present in a given recipe is always defined as 100 phr. All other non-rubber and/or non-vulcanizable components (including the ethylene-propylene copolymer, even where it is technically a rubber) are ratioed against the 100 parts of rubber and are expressed in phr. This way one can easily compare, for example, the levels of curatives or filler loadings, etc., between different compositions based on the same relative proportion of rubber without the need to recalculate percents for every component after adjusting levels of only one, or more, component(s).

Butyl rubber refers to polymers of isobutylene with from 0.5 to 10 mol % isoprene; halobutyl rubber refers to halogenated butyl rubber. Butyl rubber composition and halobutyl rubber composition refer to rubber compositions wherein the elastomer content is at least 50% butyl rubber or halobutyl rubber, respectively, by total weight of the elastomeric components, i.e., at least 50 phr butyl or halobutyl rubber.

Isoolefin refers to any olefin monomer having at least one carbon having two substitutions on that carbon.

Multiolefin or polyene refers to any monomer having two or more double bonds. In a preferred embodiment, when present in isobutylene polymers, the multiolefin employed is any monomer comprising two conjugated double bonds such as a conjugated diene like isoprene.

Isobutylene based elastomer or polymer refers to elastomers or polymers comprising at least 70 mol % repeat units from isobutylene.

The term isotactic is defined herein as a polymer sequence in which greater than 50% of the pairs of pendant methyl groups located on adjacent propylene units, which are inserted into the chain in a regular 1,2 fashion and are not part of the backbone structure, are located either above or below the atoms in the backbone chain, when such atoms in the backbone chain are all in one plane. Certain combinations of polymers in blends or polymer sequences within a single polymer are described as having "substantially the same tacticity," which herein means that the two polymers are both isotactic according to the definition above.

The term "tacticity" refers to the stereoregularity of the orientation of the methyl residues from propylene in a polymer. Pairs of methyl residues from contiguous propylene units identically inserted which have the same orientation with respect to the polymer backbone are termed "meso" (m). Those of opposite configuration are termed "racemic" (r). When three adjacent propylene groups have methyl groups with the same orientation, the tacticity of the triad is 'mm' If two adjacent monomers in a three monomer sequence have the same orientation, and that orientation is different from the relative configuration of the third unit, the tacticity of the triad is 'mr'. When the middle monomer unit has an opposite configuration from either neighbor, the triad has 'rr' tacticity. The fraction of each type of triad in the polymer can be determined and when multiplied by 100 indicates the percentage of that type found in the polymer.

The triad tacticity of the polymers described herein can be determined from a $^{13}C$ nuclear magnetic resonance (NMR) spectrum of the polymer as described below and as described in U.S. Pat. No. 5,504,172.

The tacticity index, expressed herein as "m/r," is determined by $^{13}C$ nuclear magnetic resonance (NMR). The tacticity index m/r is calculated as defined in H. N. Cheng, Macromolecules, 17, 1950 (1984). An m/r ratio of 1.0 generally describes a syndiotactic polymer, and an m/r ratio of 2.0 generally describes an atactic material. An isotactic material is theoretically may have a ratio approaching infinity, and many by-product atactic polymers have sufficient isotactic content to result in ratios of greater than 50.

The melting point (Tm) and heat of fusion of the polymers described herein can be determined by Differential Scanning calorimetry (DSC), using the ASTM E-794-95 procedure. About 6 to 10 mg of a sheet of the polymer pressed at approximately 200° C. to 230° C. is removed with a punch die and annealed at room temperature for 48 hours. At the end of this period, the sample is placed in a Differential Scanning calorimeter (Perkin Elmer Pyris Analysis System) and cooled to about −50° C. to −70° C. The sample is heated at about 20° C./min to attain a final temperature of about 180° C. to 200° C. The term "melting point," as used herein, is the highest peak among principal and secondary melting peaks as determined by DSC, discussed above. The thermal output is recorded as the area under the melting peak of the sample, which is typically at a maximum peak at about 30° C. to about 175° C. and occurs between the temperatures of about 0° C. and about 200° C. The thermal output is measured in Joules as a measure of the heat of fusion. The melting point is recorded as the temperature of the greatest heat absorption within the range of melting of the sample.

The stress-strain elongation properties of the cured compounds described herein can be measured according to the ASTM D412 procedure.

Mooney viscosity, as used herein, is measured as ML (1+4) at 100° C. according to ASTM D1646.

The determination of the Melt Flow rate (MFR) and the Melt Index of the polymer are according to ASTM D1238 using modification 1 with a load of 2.16 kg. In this version of the method a portion of the sample extruded during the test was collected and weighed. The sample analysis is conducted at 230° C. with a 1 minute preheat on the sample to provide a steady temperature for the duration of the experiment. This data expressed as dg of sample extruded per minute is indicated as MFR. In an alternative procedure, the test is conducted in an identical fashion except at a temperature of 190° C. This data is referred to as MI@190° C.

The determination of the Shore A hardness of the polymer is according to ASTM D 2240. In this version of the method, a portion of the sample is tested at room temperature. The data is recorded 3 seconds after the indentation is created in the sample.

Elastomer Compositions and Methods

In one embodiment, the elastomer composition comprises a blend of from 50 to 100 phr of a halogenated butyl rubber (also referred to as halobutyl), a cure system and from 1 to less than 10 phr of a saturated ethylene-propylene copolymer. The ethylene-propylene copolymer contains at least 60 wt % propylene-derived units, and at least 6 wt % ethylene-derived units, based on the total weight of the copolymer, wherein the copolymer has isotactic polypropylene crystallinity, a melting point, as measured by DSC methods described herein, of equal to or less than 110° C., and a heat of fusion of from 5 J/g to 50 J/g.

In an embodiment, the ethylene-propylene copolymer may comprise from 75 to 98 wt % or from 80 to 95 wt % of the propylene-derived units; and from 2 to 25 wt % or from 5 to 20 wt % of the ethylene-derived units.

In an embodiment, the ethylene-propylene copolymer can have a Mooney viscosity ML (1+4) at 100° C. of from 1 to 100, or from 5 to 80, or from 40 to 60. The copolymer can be partially insoluble and the fractions soluble at 23° C. and 31° C., as measured by the extraction method described herein. The copolymer can have an isotactic propylene triad tacticity of from 65 to 95%. The copolymer can have a tacticity index, also known as the m/r ratio as defined above, of from 6 to 8. The copolymer can have an isotacticity index of from 40 to 55.

In an embodiment, the blend of halogenated butyl rubber, cure system, and ethylene-propylene copolymer contains from 1 up to less than 10 phr of the copolymer, or from 2 to 8 phr, or from 3 to 6 phr, wherein the phr of the composition is based solely upon the rubber content of the composition (i.e., the ethylene-propylene copolymer does not contribute the calculation of phr).

Halogenated Butyl Rubber

The elastomeric compositions of the invention contain halobutyl rubber. Halobutyl rubbers are also known as halogenated butyl polymers and may be homopolymers, copolymers, or polymers derived from multiple different monomers. Polymers considered 'butyl polymers' by those in the art are polymers comprising $C_4$ to $C_7$ isomonoolefin derived units and at least one other polymerizable unit. Butyl rubbers are prepared by reacting the mixture of monomers, the mixture having at least one $C_4$ to $C_7$ isoolefin monomer with at least one multiolefin monomer. The isoolefin is in a range from 70 to 99.5 wt % by weight of the total monomer mixture in one embodiment, and 85 to 99.5 wt % in another embodiment. The multiolefin component is present in the monomer mixture from 30 to 0.5 wt % in one embodiment, and from 15 to 0.5 wt % in another embodiment. In yet another embodiment, from 8 to 0.5 wt % of the monomer mixture is multiolefin.

The isoolefin is a $C_4$ to $C_7$ compound, non-limiting examples of which are compounds such as isobutylene, isobutene, 2-methyl-1-butene, 3-methyl-1-butene, 2-methyl-2-butene, 1-butene, 2-butene, methyl vinyl ether, indene, vinyltrimethylsilane, hexene, and 4-methyl-1-pentene. As isobutylene is a commercially preferred monomer for producing butyl polymers, butyl polymers may also be referred to as isobutylene-based polymers. The multiolefin is a $C_4$ to $C_{14}$ multiolefin such as isoprene, butadiene, 2,3-dimethyl-1,3-butadiene, myrcene, 6,6-dimethyl-fulvene, hexadiene, cyclopentadiene, and piperylene, and other monomers such as disclosed in U.S. Pat. No. 5,162,425. Other polymerizable monomers such as styrene and dichlorostyrene are also suitable for homopolymerization or copolymerization in butyl rubbers.

One embodiment of the butyl rubber polymer may be obtained by reacting 95 to 99.5 wt % of isobutylene with 0.5 to 8 wt % isoprene, or from 0.5 wt % to 5.0 wt % isoprene in yet another embodiment. Butyl rubbers and methods of their production, including typical operating conditions and process methods are described in detail in various publications, for example, U.S. Pat. Nos; 3,968,076; 4,474,924; 4,068,051; 5,532,312, WO 2004/058828, WO 2004/058827, WO 2008/027589, and WO 2011/089083.

Once obtained, the butyl rubber is halogenated with chlorine or bromine by any means conventional at the time of the invention, and this invention is not herein limited by the halogenation process. In one embodiment, the butyl rubber is halogenated in hexane diluent at from 4 to 60° C. using bromine ($Br_2$) or chlorine ($Cl_2$) as the halogenation agent. The halogenated butyl rubber polymer has a Mooney Viscosity of from 20 to 70 (ML 1+8 at 125° C.) in one embodiment, and from 25 to 55 in another embodiment. The halogen wt % is from 0.1 to 10 wt % based in on the weight of the halogenated butyl rubber in one embodiment, and from 0.5 to 5 wt % in another embodiment. In yet another embodiment, the halogen wt % of the halogenated butyl rubber is from 1 to 2.5 wt %.

One commercial embodiment of a brominated butyl rubber is Bromobutyl 2222 (ExxonMobil Chemical Company, Houston, Tex.). Its Mooney viscosity is from 27 to 37 (ML 1+8 at 125° C., ASTM 1646, modified) and the bromine content is from 1.8 to 2.2 wt % relative to the weight of the polymer. Another commercial embodiment of the halogenated butyl rubber is Bromobutyl 2255 (ExxonMobil Chemical Company, Houston, Tex.). Its Mooney viscosity is from 41 to 51 (ML 1+8 at 125° C., ASTM D1646), and the bromine content is from 1.8 to 2.2 wt %. Another commercial bromobutyl is Bromobutyl 2030 (available from Lanxess Butyl Pte. Ltd) which has a Mooney viscosity of about 32 (ML 1+8 at 125° C.) and a bromine content of 1.8 wt %.

A commercial embodiment of a halogenated rubber is Chlorobutyl 1066 (ExxonMobil Chemical Company, Houston, Tex.). Its Mooney viscosity is from 33 to 43 (ML 1+8 at 125° C., ASTM 1646, modified), and the chlorine content is from 1.18 to 1.34 wt % relative to the weight of the polymer. Another commercial chlorobutyl is Chlorobutyl 1240 (available from Lanxess Butyl Pte. Ltd), having a Mooney viscosity of about 38 (ML 1+8 at 125° C.) and a chlorine content of 1.25 wt %.

Another embodiment of a halobutyl rubber is a halogenated branched or "star-branched" butyl rubber ("SBB"); star-branched butyl rubbers are described in, for example, U.S. Pat. Nos. 5,182,333 and 5,071,913. Star-branched butyl rubber is a polymer derived from monomers used to form a butyl polymer and a polydiene or block copolymer branching agent. The present invention is not limited by the method of forming the SBB. The polydienes/block copolymer, or branching agents (hereinafter "polydienes"), are typically cationically reactive and are present during the polymerization of the butyl rubber or can be blended with a butyl rubber to form the SBB. The SBB is known for being a blend of star-branched polymer chains and non star-branched polymer chains.

When used in any embodiment, the SBB may be a composition of the butyl rubber as described above and a copolymer of a polydiene and a partially hydrogenated polydiene selected from the group including styrene, polybutadiene, polyisoprene, polypiperylene, natural rubber, styrene-butadiene rubber, ethylene-propylene diene rubber (EPDM), ethylene-propylene rubber (EPR), styrene-butadiene-styrene and styrene-isoprene-styrene block copolymers. The branching agent or polydiene can be any suitable branching agent, and the invention is not limited to the type of polydiene used to make the SBB. The polydienes are present, based on the total monomer weight, greater than 0.3 wt % in one embodiment, and from 0.3 to 3 wt % in another embodiment, and from 0.4 to 2.7 wt % in yet another embodiment. The SBB is then halogenated as described above in a manner similar to other butyl rubbers.

A commercial embodiment of halogenated SBB is Bromobutyl 6222 (ExxonMobil Chemical Company, Houston, Tex.), having a Mooney viscosity (ML 1+8 at 125° C., ASTM D1646) of from 27 to 37, and a bromine content of from 2.2 to 2.6 wt % relative to the halogenated star branched butyl rubber. Typical cure characteristics of Bromobutyl 6222 are as follows: MH is from 24 to 38 dN-·m, ML is from 6 to 16 dN-·m (ASTM D2084).

Ethylene-Propylene Polymer

In accordance with the present invention, an ethylene-propylene polymer is with into a halobutyl rubber to enhance processing and/or provide an improved rubber formulation which results in improved end use performance characteristics.

The polymer comprises propylene-derived units and ethylene-derived units, and can have isotactic polypropylene crystallinity, a melting point equal to or less than 110° C., and a heat of fusion, as determined by DSC, of from 5 J/g to 50 J/g. The propylene-derived units of the polymer are present in an amount of at least 60 wt %, based on the total weight of the polymer. The ethylene-derived units are present in an amount of at least 6 wt %, based on the weight of the polymer. Other olefin-derived units can optionally be present in an amount within the range of from 0.3 to 10 wt %, based on the combined weight of units derived from propylene, ethylene and the other olefin(s).

The ethylene-propylene copolymer may be a random propylene copolymer having crystalline regions interrupted by non-crystalline regions. The non-crystalline regions may result from regions of non-crystallizable polypropylene segments and/or the inclusion of comonomer units. The crystallinity and the melting point of the ethylene-propylene copolymer are reduced compared to highly isotactic polypropylene by the introduction of errors in the insertion of propylene and/or by the presence of comonomer.

The crystallinity of the ethylene-propylene copolymer may be expressed in terms of heat of fusion. In particular embodiments, the ethylene-propylene copolymer can have a heat of fusion, as determined by DSC, ranging from a lower limit of 5.0 J/g, or 6.0 J/g, or 7.0 J/g, to an upper limit of 30 J/g, or 40 J/g, or 50 J/g. The crystallinity can also be expressed in terms of crystallinity percent. The thermal energy for the highest order of polypropylene is estimated at 189 J/g. That is, 100% crystallinity is equal to 189 J/g. Therefore, in particular embodiments, the copolymer has a propylene crystallinity within the range having an upper limit of 65%, or 40%, or 30%, or 25%, or 20%, and a lower limit of 1%, or 3%, or 5%, or 7%, or 8%.

The level of crystallinity is also reflected in the melting point. The term "melting point," as used herein is the highest peak among principal and secondary melting peaks, as determined by DSC. In particular embodiments, the ethylene-propylene copolymer has a melting point ranging from an upper limit of 110° C., or 105° C., or 90° C., or 80° C., or 70° C. to a lower limit of 0° C., or 20° C., or 25° C., or 30° C., or 35° C., or 40° C., or 45° C.

The ethylene-propylene copolymer generally comprises at least 60 wt % propylene-derived units, and in particular embodiments, the propylene-based copolymer comprises at least 75 wt %, or at least 80 wt % propylene-derived units. Ethylene-propylene copolymers suitable in the invention have an isotactic propylene triad tacticity within the range having a lower limit of 65%, or 70%, or 75% to an upper limit of 95%, or 97%, or 98%, or 99%. The isotactic propylene triad tacticity of a polymer is the relative tacticity of a sequence of three adjacent propylene units, a chain consisting of head to tail bonds, expressed as a binary combination of m and r sequences. The isotactic propylene triad tacticity of the polymers disclosed herein may be determined using $C^{13}$NMR and the calculations outlined in U.S. Pat. No. 5,504,172.

The ethylene-propylene copolymer in the elastomeric composition of an embodiment can have an isotacticity index greater than 0%, or within the range having an upper limit of 50%, or 25% and a lower limit of 3%, or 10%. The copolymer of an embodiment can have a tacticity index (m/r) within the range having an upper limit of 8, or 10, or 12, and a lower limit of 4 or 6.

In some embodiments, the crystallinity of the ethylene-propylene copolymer is reduced by the copolymerization of propylene with limited amounts of ethylene and one or more comonomers selected from $C_4$-$C_{20}$ alpha-olefins. In these copolymers, the amount of propylene-derived units present in the ethylene-propylene copolymer ranges from an upper limit of 94 wt %, or 92 wt %, or 90 wt % to a lower limit of 60 wt %, 68 wt %, or 70 wt %, or 71 wt %, or 75 wt %, or 76 wt %, or 80 wt %, based on the total weight of the ethylene-propylene copolymer. The amount of units derived from ethylene and any optional $C_4$-$C_{20}$ alpha-olefins present in the copolymer ranges from an upper limit of 40 wt %, or 35 wt %, or 30 wt %, or 28 wt %, or 25 wt %, or 20 wt % to a lower limit of 6 wt %, or 8 wt %, or 10 wt %, based on the total weight of the ethylene-propylene copolymer. The amount of optional $C_4$-$C_{20}$ alpha-olefin-derived units present in the ethylene-propylene copolymer ranges from an upper limit of 25 wt %, or 20 wt %, or 15 wt %, or 10 wt %, or 7 wt %, or 5 wt %, or 4.5 wt %, or 3 wt %, or 2.5 wt %, to a lower limit of 0 wt %, or 0.1 wt %, or 0.2 wt %, or 0.3 wt %, or 0.5 wt %, or 1 wt %, or 1.5 wt % based on the total weight of the ethylene-propylene copolymer. Non-limiting examples of α-olefin(s) optionally present in the propylene-based copolymer include 1-butene, 1-pentene, 1-hexene, 1-octene, and 1-dodecene.

In an embodiment, the ethylene-propylene copolymer is saturated and/or has a saturated backbone. Polyene-derived units derived from a hydrocarbon structure having at least two unsaturated bonds are generally not present in the saturated copolymer. Non-limiting examples of polyenes to be excluded in an embodiment include 5-ethylidene-2-norbornene ("ENB"), 5-vinyl-2-norbornene ("VNB"), divinyl benzene ("DVB"), and dicyclopentadiene ("DCPD"). In some embodiments, the ethylene-propylene copolymer comprises less than 0.1% or less than 0.05% polyene-derived units. In some embodiments, the ethylene-propylene copolymer comprises less than 0.01% or less than 0.005% olefinic hydrogen atoms.

In certain embodiments, the ethylene-propylene copolymer has a density within the range from 0.840 g/cm³ to 0.920 g/cm³, and from 0.845 g/cm³ to 0.900 g/cm³ in another embodiment, and from 0.850 g/cm³ to 0.890 g/cm³ in yet another embodiment, the values measured at room temperature per the ASTM D-1505 test method.

In certain embodiments, the ethylene-propylene copolymers have a Shore A hardness (ASTM D2240) within the range from 10 or 20 to 80 or 90 Shore A. In yet another embodiment, the copolymers possess an Ultimate Elongation from greater than 500% or 1000% or 2000%; and within the range from 300% or 400% or 500% to 800% or 1,200% or 1,800% or 2,000 or 3,000% in other embodiments.

The ethylene-propylene copolymer of an embodiment can have a weight average molecular weight ($M_w$) within the range having an upper limit of 5,000,000 g/mol, or 1,000,000 g/mol, or 500,000 g/mol, and a lower limit of 10,000 g/mol, or 15,000 g/mol, or 20,000 g/mol, or 80,000 g/mol, and a molecular weight distribution $M_w/M_n$ (MWD), sometimes referred to as a "polydispersity index" (PDI), within the range having an upper limit of 40, or 20, or 10, or 5, or 4.5, or 4.0, or 3.2, or 3.0, and a lower limit of 1.5, or 1.8, or 2.0. The ethylene-propylene copolymer in embodiments has an MFR within the range having an upper limit of 15 dg/min, or 10 dg/min, or 5 dg/min and a lower limit of 0.1 g/min, or 0.5 dg/min, or 1 dg/min. In yet another embodiment, the copolymers have a z-average molecular weight (Mz) value within the range from 20,000 to 7,000,000 g/mol, and from 100,000 to 700,000 g/mol in another embodiment, and from 140,000 to 500,000 g/mol in yet another embodiment.

Illustrative non-limiting examples of suitable ethylene-propylene copolymers, as well as the methods for preparing them, include the isotactic copolymer disclosed in U.S. Pat. No. 6,960,635; and the ethylene-propylene copolymers disclosed in U.S. Pat. No. 6,525,157; and the ethylene-propylene copolymers disclosed in U.S. Pat. No. 8,026,323; all of which are hereby incorporated herein by reference. Separate from, or in combination with the foregoing, the crystallinity of the copolymer can be reduced also by stereo-irregular incorporation of the propylene-derived units, which can be influenced by, for example, the choice of catalyst and polymerization temperature.

The ethylene-propylene copolymers of an embodiment are not limited by any particular polymerization method of preparation, and the polymerization processes described herein are not limited by any particular type of reaction vessel. In a particular embodiment, the catalyst system used to produce the ethylene-propylene copolymer includes one or more transition metal compounds and one or more activators. When alumoxane or aluminum alkyl activators are used, the combined pre-catalyst-to-activator molar ratio is generally from 1:5000 to 10:1. When ionizing activators are used, the combined pre-catalyst-to-activator molar ratio is generally from 10:1 to 1:10. Multiple activators may be used, including using mixtures of alumoxanes or aluminum alkyls with ionizing activators.

In another embodiment, the catalyst system includes a bis(cyclopentadienyl) metal compound and either (1) a non-coordinating compatible anion activator, or (2) an alumoxane activator. Non-limiting examples of such catalyst systems are described in U.S. Pat. No. 5,198,401 and 5,391,629.

In another embodiment, the ethylene-propylene copolymer is made in the presence of an activating cocatalyst which is a precursor ionic compound comprising a halogenated tetra-aryl-substituted Group 13 anion wherein each aryl substituent contains at least two cyclic aromatic rings. In a particular aspect of this embodiment, the ethylene-propylene copolymer contains greater than 0.2 parts per million, or greater than 0.5 parts per million, or greater than 1 part per million, or greater than 5 parts per million of the residues of the activating cocatalyst.

In another particular embodiment, the catalyst system used to produce the ethylene-propylene copolymer includes an Hf-containing metallocene catalyst, such as but not limited to dimethyl silyl bis(indenyl) hafnium dimethyl, and a non-coordinating anion activator, such as but not limited to dimethyl anilinium tetrakis(heptafluoronaphthyl) borate. In yet another particular embodiment, the copolymer is produced using any of the catalyst systems and polymerization methods disclosed in U.S. Pat. No. 6,881,800. In yet another particular embodiment, the copolymer is produced using a catalyst system such as one of the nonmetallocene, metal-centered, heteroaryl ligand catalyst systems described in U.S. Pat. No. 6,960,635.

The amount of ethylene-propylene copolymer present in the elastomeric composition can range from a lower limit of 1, 2 or 3 phr to an upper limit of less than 10, 8, 6, 5 or 4 phr.

Embodiments of ethylene-propylene polyolefin polymers are available commercially under the trade names VISTA-MAXX™ (ExxonMobil Chemical Company, Houston, Tex., USA) and VERSIFY™ (The Dow Chemical Company, Midland, Mich., USA), certain grades of TAFMER™ XM or NOTIO™ (Mitsui Company, Japan) or certain grades of SOFTELL™ (Lyondell Basell Polyolefine GmbH, Germany).

Additional Blend Rubbers

Within the scope of any embodiment of the present invention, as the base elastomeric components in the composition, the elastomeric composition contains from 70 phr up to 100 phr of the halobutyl rubber and optionally up to 30 phr of another blend rubber other than the halobutyl rubber.

In embodiments, the blend rubber may include a non-halogenated butyl rubber as described above. A commercial example of a butyl rubber is EXXON™ BUTYL Grades of poly(isobutylene-co-isoprene), having a Mooney viscosity of from 32±2 to 51±5 (ML 1+8 at 125° C.) (ExxonMobil Chemical Company, Houston, Tex.).

The optional blend rubber in an embodiment can be a general purpose rubber. Examples of general purpose rubbers include natural rubbers, polyisoprene rubber, poly(styrene-co-butadiene) rubber, polybutadiene rubber, poly(isoprene-co-butadiene) rubber, and styrene-isoprene-butadiene rubber, and mixtures thereof. Thus, in any embodiment the optional blend rubber may be selected from natural rubbers, polyisoprene rubber, poly(styrene-co-butadiene) rubber, polybutadiene rubber, poly(isoprene-co-butadiene) rubber, styrene-isoprene-butadiene rubber, butyl rubber, non-halogenated star branched butyl rubber, poly(isobutylene-co-alkylstyrene), and the like. In an embodiment, the blend rubber can include a mixture of at least two of these elastomers, such as, for example, a mixture of natural rubber and polybutadiene rubber.

In one embodiment, the optional blend rubber can also include a specialty rubber containing a polar functional group such as butadiene-acrylonitrile rubber (NBR, or nitrile rubber), a copolymer of 2-propenenitrile and 1,3-butadiene. Nitrile rubber can have an acrylonitrile content of from 10 to 50 wt % in one embodiment, from 15 to 40 wt % in another embodiment, and from 18 to 35 wt % in yet another embodiment.

In another embodiment, the optional blend rubber can include a derivative of NBR such as hydrogenated or carboxylated or styrenated nitrile rubbers. Butadiene-acrylonitrile-styrene rubber, a copolymer of 2-propenenitrile, 1,3-butadiene and styrene, can have an acrylonitrile content of from 10 to 40 wt % in one embodiment, from 15 to 30 wt % in another embodiment, and from 18 to 30 wt % in yet another embodiment. The styrene content of the SNBR copolymer may range from 15 wt % to 40 wt % in one embodiment, and from 18 wt % to 30 wt % in another embodiment, and from 20 to 25 wt % in yet another embodiment.

In yet another embodiment, the optional blend rubber can include a specialty rubber containing a halogen group such as polychloroprene, a homopolymer of 2-chloro-1,3-butadiene.

The total amount of optional blend rubber present in the elastomeric composition can range from a lower limit of 0, 1, 5, or 10 phr to an upper limit of 20 to 30 phr. In another embodiment, when there are more than one blend rubber employed in the composition, the optional blend rubber mixture may comprise NR in a proportion from a lower limit of 10, 20, 30, 40 or 45 percent by weight to an upper limit of 55, 60, 70, 80, 90, 95 or 100 percent by weight of the total optional blend rubber component, and another optional blend rubber, wherein the NR and other blend rubber together comprise 100 percent of the optional blend rubber components.

Cure System

To be useful in a molded or shaped article, the elastomeric composition contains a cure package wherein the cure package has at least one curative or crosslinking agent, and the elastomeric composition undergoes a process to cure the elastomeric composition. As used herein, at least one curative package refers to any material or method capable of imparting cured properties to a rubber as commonly understood in the industry. At least one curative package may include any and at least one of sulfur, zinc oxide, and fatty acids. Peroxide cure systems or resin cure systems may also be used depending on the use of the elastomeric composition. Further, heat or radiation-induced crosslinking of polymers may be used.

For elastomeric compositions wherein silica is used as a filler in the composition, the crosslinking agent may be a bifunctional organosilane crosslinking agent. An "organosilane crosslinking agent" is any silane coupled filler and/or crosslinking activator and/or silane reinforcing agent known to those skilled in the art including, but not limited to, vinyl triethoxysilane, vinyl-tris-(beta-methoxyethoxy)silane, methacryloylpropyltri-methoxysilane, gamma-amino-propyl triethoxysilane (sold commercially as A1100 by Witco), gamma-mercaptopropyltrimethoxysilane (A189 by Witco) and the like, and mixtures thereof. In one embodiment, bis-(3-triethoxysilylpropyl)tetrasulfide (sold commercially as "Si69") is employed.

Generally, polymer blends used in the production of reinforced elastomeric articles, such as tires and hoses, are crosslinked/vulcanized to thereby improve the polymer's mechanical properties. It is known that the physical properties, performance characteristics, and durability of vulcanized rubber compounds are directly related to the number (crosslink density) and type of crosslinks formed during the vulcanization reaction. Sulfur is the most common chemical vulcanizing agent for diene-containing elastomers. It exists as a rhombic 8-member ring or in amorphous polymeric forms. The sulfur vulcanization system also consists of the accelerator to activate the sulfur, an activator, and a retarder to help control the induction time. Accelerators serve to control the induction time and rate of vulcanization, and the number and type of sulfur crosslinks that are formed. These factors play a significant role in determining the performance properties of the vulcanizate.

Activators are chemicals that increase the rate of vulcanization by reacting first with the accelerators to form rubber-soluble complexes which then react with the sulfur to form sulfurating agents. General classes of accelerators include amines, diamines, guanidines, thioureas, thiazoles, thiurams, sulfenamides, sulfenimides, thiocarbamates, xanthates, and the like.

Retarders may be used to increase the cure induction time to allow sufficient time to process the unvulcanized rubber.

Halogen-containing elastomers such as halogenated star-branched butyl rubber, brominated butyl rubber, chlorinated butyl rubber, star-branched brominated butyl (polyisobutylene/isoprene copolymer) rubber, halogenated poly(isobutylene-co-p-methylstyrene), polychloroprene, and chlorosulfonated polyethylene may be crosslinked by their reaction with metal oxides. The metal oxide is thought to react with halogen groups in the polymer to produce an active intermediate which then reacts further to produce carbon-carbon bonds. Zinc halide is liberated as a by-product and it serves as an autocatalyst for this reaction.

The elastomeric composition may also be crosslinked by adding curative molecules, for example sulfur, metal oxides, organometallic compounds, radical initiators, etc., followed by heating. In particular, the following metal oxides are common curatives that will function in an embodiment: ZnO, CaO, MgO, $Al_2O_3$, $CrO_3$, FeO, $Fe_2O_3$, and NiO. These metal oxides can be used alone or in conjunction with the corresponding metal fatty acid complex (e.g., zinc stearate, calcium stearate, etc.), or with the organic and fatty acids added alone, such as stearic acid, and optionally other curatives such as sulfur or a sulfur compound, an alkylperoxide compound, diamines or derivatives thereof (e.g., DIAK products sold by DuPont). This method of curing elastomers may be accelerated and is often used for the vulcanization of elastomer blends.

The acceleration of the cure process is accomplished in an embodiment by adding to the composition an amount of an accelerant, often an organic compound. The mechanism for accelerated vulcanization of natural rubber involves complex interactions between the curative, accelerator, activators and polymers. Ideally, the entire available curative is consumed in the formation of effective crosslinks which join together two polymer chains and enhance the overall strength of the polymer matrix. Numerous accelerators are known in the art and include, but are not limited to, the following: stearic acid, diphenyl guanidine (DPG), tetramethylthiuram disulfide (TMTD), 4,4'-dithiodimorpholine (DTDM), tetrabutylthiuram disulfide (TBTD), benzothiazyl disulfide (MBTS), hexamethylene-1,6-bisthiosulfate disodium salt dihydrate (sold commercially as DURALINK™ HTS by Flexsys), 2-morpholinothio benzothiazole (MBS or MOR), blends of 90% MOR and 10% MBTS (MOR 90), N-tertiarybutyl-2-benzothiazole sulfenamide (TBBS), and N-oxydiethylene thiocarbamyl-N-oxydiethylene sulfonamide (OTOS), zinc 2-ethyl hexanoate (ZEH), and "thioureas."

In embodiments, the cure system comprises less than 2 phr sulfur, e.g., 0.1 to 2 phr, or 0.4 to 1.7 phr. In an embodiment, the cure system comprises metal oxide, e.g., from 1 to 5 phr metal oxide such as ZnO. In an embodiment, the cure system comprises from 2 to 5 phr accelerators. In an embodiment, the cure system comprises from 1 to 5 phr zinc oxide, from 0.4 to 0.8 phr sulfur and from 2 to 5 phr accelerators.

Other Components

The elastomeric compositions may also include a variety of other components when fully compounded to achieve the desired composition having the desired end use properties. For example, the elastomeric compositions may optionally comprise: a) at least one filler, for example, calcium carbonate, clay, mica, silica, silicates, talc, titanium dioxide, starch, wood flour, carbon black, or mixtures thereof; b) at least one layered filler, for example, montmorillonite, nontronite, beidellite, volkonskoite, laponite, hectorite, saponite, sauconite, magadite, kenyaite, stevensite, vermiculite, halloysite, aluminate oxides, hydrotalcite, or mixtures thereof, optionally, treated with modifying agents; c) at least one processing oil, for example, aromatic oil, naphthenic oil, paraffinic oil, or mixtures thereof; d) at least one additional processing aid (in addition to the ethylene-propylene copolymer), for example, plastomer, polybutene, polyalphaolefin oils, or mixtures thereof; or e) any combination of a-d.

Fillers

The elastomeric composition may have one or more filler components such as, for example, calcium carbonate, silica, clay and other silicates which may or may not be exfoliated, talc, titanium dioxide, and carbon black. The fillers may be any size and typically range, for example, from about 0.0001 µm to about 100 µm. As used herein, silica is meant to refer to any type or particle size silica or another silicic acid derivative, or silicic acid, processed by solution, pyrogenic or the like methods and having a surface area, including untreated, precipitated silica, crystalline silica, colloidal silica, aluminum or calcium silicates, fumed silica, and the like.

In one embodiment, the filler can be carbon black or modified carbon black, and combinations of any of these. In another embodiment, the filler can be a blend of carbon black and silica. The preferred filler for such articles as tire treads and sidewalls is reinforcing grade carbon black present at a level of from 10 to 100 phr of the blend, more preferably from 30 to 80 phr in another embodiment, and from 50 to 80 phr in yet another embodiment. Useful grades of carbon black, as described in RUBBER TECHNOLOGY, pp. 59-85, range from N110 to N990. More desirably, embodiments of the carbon black useful in, for example, tire treads are N229, N351, N339, N220, N234 and N110 provided in ASTM (D3037, D1510, and D3765). Embodiments of the carbon black useful in, for example, sidewalls in tires are N326, N330, N347, N351, N550, N660, and N762. Carbon blacks suitable for innerliners and other air barriers include N550, N660, N650, N762, N990 and REGAL® 85.

Layered Fillers

The layered filler may comprise a layered clay, optionally, treated or pre-treated with a modifying agent such as organic molecules. The elastomeric compositions may incorporate such a layered filler clay, optionally, treated or pre-treated with a modifying agent, to form a nanocomposite or nanocomposite composition. Nanocomposites include at least one elastomer as described above and at least one modified layered filler.

In an embodiment, the layered filler such as a layered clay may comprise at least one silicate. In certain embodiments, the silicate may comprise at least one "smectite" or "smectite-type clay" referring to the general class of clay minerals with expanding crystal lattices. For example, this may include the dioctahedral smectites which consist of montmorillonite, beidellite, and nontronite, and the trioctahedral smectites, which include saponite, hectorite, and sauconite. In other embodiments, the at least one silicate may comprise natural or synthetic phyllosilicates, such as montmorillonite, nontronite, beidellite, bentonite, volkonskoite, laponite, hectorite, saponite, sauconite, magadite, kenyaite, stevensite and the like, as well as vermiculite, halloysite, aluminate oxides, hydrotalcite, and the like. Combinations of any of the previous embodiments are also contemplated.

The layered filler clays described above may be modified such as intercalated or exfoliated by treatment with at least one modifying agent or swelling agent or exfoliating agent or additive capable of undergoing ion exchange reactions with the cations present at the interlayer surfaces of the layered filler. Modifying agents are also known as swelling or exfoliating agents. Generally, they are additives capable of undergoing ion exchange reactions with the cations present at the interlayer surfaces of the layered filler. Suitable exfoliating additives include cationic surfactants such as ammonium, alkylamines or alkylammonium (primary, secondary, tertiary and quaternary), phosphonium or sulfonium derivatives of aliphatic, aromatic or arylaliphatic amines, phosphines and sulfides.

For example, amine compounds (or the corresponding ammonium ion) are those with the structure $R^2R^3R^4N$, wherein $R^2$, $R^3$, and $R^4$ are $C_1$ to $C_{30}$ alkyls or alkenes in one embodiment, $C_1$ to $C_{20}$ alkyls or alkenes in another embodiment, which may be the same or different. In one embodiment, the exfoliating agent is a so-called long chain tertiary amine, wherein at least $R^2$ is a $C_{14}$ to $C_{20}$ alkyl or alkene. In other embodiments, a class of exfoliating additives can include those which can be covalently bonded to the interlayer surfaces. These include polysilanes of the structure —Si$(R^5)_2R^6$ where $R^5$ is the same or different at each occurrence and is selected from alkyl, alkoxy or oxysilane and $R^6$ is an organic radical compatible with the matrix polymer of the composite. Other suitable exfoliating additives can include protonated amino acids and salts thereof containing 2-30 carbon atoms such as 12-aminododecanoic acid, epsilon-caprolactam and like materials.

Examples of some commercial products are cloisites produced by Southern Clay Products, Inc. in Gonzales, Tex., e.g., Cloisite Na+, Cloisite 30B, Cloisite 10A, Cloisite 25A, Cloisite 93A, Cloisite 20A, Cloisite 15A, and Cloisite 6A. They are also available as SOMASIF and LUCENTITE clays produced by CO-OP Chemical Co., LTD., in Tokyo, Japan, e.g, SOMASIF™ MAE, SOMASIF™ MEE, SOMASIF™ MPE, SOMASIF™ MTE, SOMASIF™ ME-100, LUCENTITE™ SPN, and LUCENTITE (SWN).

The amount of clay or exfoliated clay incorporated in the nanocomposites in accordance with an embodiment is sufficient to develop an improvement in the mechanical properties or barrier properties of the nanocomposite, for example, tensile strength or oxygen permeability. Amounts generally will range from 0.5 to 15 wt % in one embodiment, and from 1 to 10 wt % in another embodiment, based on the polymer content of the nanocomposite. Expressed in parts per hundred rubber, the clay or exfoliated clay may be present from 1 to 50 phr in one embodiment, and from 5 to 30 phr in another embodiment.

Additional Processing Aids

Plastomers useful as processing aids in an elastomeric composition can be described as polyolefin copolymers having a density of from 0.85 to 0.915 g/cm³ and a melt index (MI) between 0.10 and 30 dg/min. In one embodiment, the plastomer can be a copolymer of ethylene derived units and at least one of $C_3$ to $C_{10}$ α-olefin derived units, the copolymer having a density in the range of less than 0.915 g/cm³. The amount of comonomer ($C_3$ to $C_{10}$ α-olefin derived units) present in the plastomer can range from 2 wt % to 35 wt % in one embodiment, and from 5 wt % to 30 wt % in another embodiment, and from 15 wt % to 25 wt % in yet another embodiment, and from 20 wt % to 30 wt % in yet another embodiment.

The plastomer can have a melt index (MI) of between 0.10 and 20 dg/min (ASTM is D1238; 190° C., 2.1 kg) in one embodiment, and from 0.2 to 10 dg/min in another embodiment, and from 0.3 to 8 dg/min in yet another embodiment. The average molecular weight of the plastomers can range from 10,000 to 800,000 in one embodiment, and from 20,000 to 700,000 in another embodiment. The 1% secant flexural modulus (ASTM D790) of the plastomers can range from 10 MPa to 150 MPa in one embodiment, and from 20 MPa to 100 MPa in another embodiment. Further, the plastomer can have a melting temperature (Tm) of from 50 to 62° C. (first melt peak) and from 65 to 85° C. (second melt peak) in one embodiment, and from 52 to 60° C. (first melt peak) and from 70 to 80° C. (second melt peak) in another embodiment.

Plastomers can be metallocene catalyzed copolymers of ethylene derived units and higher α-olefin derived units such as propylene, 1-butene, 1-hexene and 1-octene, and which contain enough of one or more of these comonomer units to yield a density between 0.860 and 0.900 g/cm³ in one embodiment. The molecular weight distribution (Mw/Mn) of desirable plastomers can range from 2 to 5 in one embodiment, and from 2.2 to 4 in another embodiment.

In one embodiment, a polybutene processing oil may be present in the composition. In one embodiment, the polybutene processing oil can be a low molecular weight (less than 15,000 Mn) homopolymer or copolymer of olefin derived units having from 3 to 8 carbon atoms in one embodiment, preferably from 4 to 6 carbon atoms in another embodiment. In one embodiment, the polybutene processing oil is a copolymer of at least isobutylene derived units, 1-butene derived units, and 2-butene derived units. In one embodiment, the polybutene is a homopolymer, copolymer, or copolymer of the three units, wherein the isobutylene derived units are from 40 to 100 wt % of the copolymer, the 1-butene derived units are from 0 to 40 wt % of the copolymer, and the 2-butene derived units are from 0 to 40 wt % of the copolymer. In another embodiment, the polybutene is a copolymer or copolymer of the three units, wherein the isobutylene derived units are from 40 to 99 wt % of the copolymer, the 1-butene derived units are from 2 to 40 wt % of the copolymer, and the 2-butene derived units are from 0 to 30 wt % of the copolymer. In yet another embodiment, the polybutene is a copolymer of the three units, wherein the isobutylene derived units are from 40 to 96 wt % of the copolymer, the 1-butene derived units are from 2 to 40 wt % of the copolymer, and the 2-butene derived units are from 2 to 20 wt % of the copolymer. In yet another embodiment, the polybutene is a homopolymer or copolymer of isobutylene and 1-butene, wherein the isobutylene derived units are from 65 to 100 wt % of the homopolymer or copolymer, and the 1-butene derived units are from 0 to 35 wt % of the copolymer.

Polybutene processing oils can have a number average molecular weight (Mn) of less than 10,000 in one embodiment, less than 8000 in another embodiment, and less than 6000 in yet another embodiment. In one embodiment, the polybutene oil has a number average molecular weight of greater than 400, and greater than 700 in another embodiment, and greater than 900 in yet another embodiment. An embodiment can be a combination of any lower molecular weight limit with any upper molecular weight limit herein. For example, in one embodiment of the polybutene, the polybutene has a number average molecular weight of from 400 to 10,000, and from 700 to 8000 in another embodiment, and from 900 to 3000 in yet another embodiment. Useful viscosities of the polybutene processing oil ranges from 10 to 6000 cSt (centiStokes) at 100° C. in one embodiment, and from 35 to 5000 cSt at 100° C. in another embodiment, and is greater than 35 cSt at 100° C. in yet another embodiment, and greater than 100 cSt at 100° C. in yet another embodiment.

The elastomeric composition of an embodiment may include one or more types of polybutene as a mixture, blended with addition of the copolymer to blend rubber, or preblended with either the copolymer or blend rubber. The amount and identity (e.g., viscosity, Mn, etc.) of the polybutene processing oil mixture can be varied in this manner. In this manner, the physical properties of the composition can be controlled. More particularly, the phrases "polybutene processing oil," or "polybutene processing oil" include a single oil or a composition of two or more oils used to obtain any viscosity or molecular weight (or other property) desired, as specified in the ranges disclosed herein.

The polybutene processing oil or oils are present in the elastomeric composition of an embodiment from 1 to 60 phr in one embodiment, and from 2 to 40 phr in another embodiment, from 4 to 35 phr in another embodiment, and from 5 to 30 phr in yet another embodiment, and from 2 to 10 phr in yet another embodiment, and from 5 to 25 phr in yet another embodiment, and from 2 to 20 phr in yet another embodiment, wherein a desirable range of polybutene may be any upper phr limit combined with any lower phr limit described herein. Preferably, the polybutene processing oil does not contain aromatic groups or unsaturation.

Processing aids can also be selected from commercially available compounds such as so called "isoparaffins," "poly-alphaolefins" (PAOs) and "polybutenes" (a subgroup of PAOs). These three classes of compounds can be described as paraffins which can include branched, cyclic, and normal structures, and blends thereof. These processing aids can be described as comprising $C_6$ to $C_{200}$ paraffins in one embodiment, and $C_8$ to $C_{100}$ paraffins in another embodiment.

Other processing aids can include esters, polyethers, and polyalkylene glycols. Other processing aids may be present or used in the manufacture of the elastomeric compositions of an embodiment. Processing aids include, but are not limited to, plasticizers, tackifiers, extenders, chemical conditioners, homogenizing agents and peptizers such as mercaptans, petroleum and vulcanized vegetable oils, mineral oils, paraffinic oils, polybutene aids, naphthenic oils, aromatic oils, waxes, resins, rosins, and the like.

The total amount of processing aids in an elastomeric composition or used in the manufacturing process of the elastomeric composition is from 1 to 70 phr in one embodiment, from 3 to 60 phr in another embodiment, and from 5 to 50 phr in yet another embodiment.

The elastomeric compositions may also contain other conventional components and additives customarily used in rubber mixes, such as effective amounts of other nondiscolored and nondiscoloring processing aids, pigments, antioxidants, and/or antiozonants.

Processing

Blends of elastomers may be reactor blends and/or melt mixes. Mixing of the components may be carried out by combining the polymer components, filler and any layered filler in the form of an intercalate in any suitable mixing device such as a two-roll open mill, Brabender™ internal mixer, Banbury™ internal mixer with tangential rotors, Krupp internal mixer with intermeshing rotors, or preferably a mixer/extruder, by techniques known in the art. Mixing is performed at temperatures in the range from up to the melting point of the elastomer and/or secondary rubber used in the composition in one embodiment, from 40° C. up to 250° C. in another embodiment, and from 100° C. to 200° C. in yet another embodiment. When a layered filler is added to the composition, the mixing is performed under shear conditions sufficient to allow the layered filler to exfoliate and become uniformly dispersed within the polymer to form the desired nanocomposite.

Typically, from 70% to 100% of the elastomer or elastomers is first mixed for 20 to 90 seconds, or until the temperature reaches from 40° C. to 75° C. Then, ¾ of the filler, and the remaining amount of elastomer, if any, are typically added to the mixer, and mixing continues until the temperature reaches from 90 to 150° C. Next, the remaining filler is added, as well as the processing oil, and mixing continues until the temperature reaches from 140 to 190° C. The masterbatch mixture is then finished by sheeting on an open mill and allowed to cool, for example, to from 60° C. to 100° C. when the curatives are added.

Mixing with layered clays is performed by techniques known to those skilled in the art, wherein the clay is added to the polymer at the same time as the carbon black in one embodiment. The polybutene processing oil is typically added later in the mixing cycle after the carbon black and clay have achieved adequate dispersion in the elastomeric matrix.

The elastomeric compositions of an embodiment may be extruded, compression molded, blow molded, injection molded, and laminated into various shaped articles including fibers, films, laminates, layers, industrial parts such as automotive parts, appliance housings, consumer products, packaging, and the like.

In particular, the elastomeric compositions are useful in articles for a variety of tire applications such as truck tires, bus tires, automobile tires, motorcycle tires, off-road tires, aircraft tires, and the like. The elastomeric compositions may either be fabricated into a finished article or a component of a finished article such as a sidewall for a tire. Additionally, the elastomeric compositions may also be used as adhesives, caulks, sealants, and glazing compounds. They are also useful as plasticizers in rubber formulations; as components to compositions that are manufactured into stretch-wrap films; as dispersants for lubricants; and in potting and electrical cable filling materials.

In another embodiment, the invention provides an article comprising the vulcanizate. In an embodiment, the article can be a tire inner tube, which may comprise chlorobutyl rubber. In an embodiment, the article can be a tire innerliner, which may comprise bromobutyl rubber.

In yet other applications, the elastomer(s) or elastomeric compositions of an embodiment are also useful in medical applications such as pharmaceutical stoppers and closures, coatings for medical devices, and the arts for paint rollers.

The invention, accordingly, provides the following embodiments:

A. An elastomer composition comprising a blend of 50 to 100 phr of a halobutyl rubber, a cure system, and from 1 to less than 10 phr of a saturated ethylene-propylene copolymer comprising at least 60 wt % propylene-derived units, and at least 6 wt % ethylene-derived units, based on the total weight of the copolymer, wherein the copolymer has isotactic polypropylene crystallinity, a melting point equal to or less than 110° C., and a heat of fusion of from 5 J/g to 50 J/g;

B. The elastomer composition of embodiment A wherein the copolymer comprises from 65 to 94 wt % of the propylene-derived units, or 75 to 94 wt % of the propylene-derived units, or 75 to 90 wt % of the propylene derived units, all based on the total weight of the polymer;

C. The elastomer composition of embodiment A or B wherein the copolymer comprises from 6 to 40 wt % of the ethylene-derived units, or 6 to 30 wt % of the ethylene-derived units, or 10 to 35 wt % of the ethylene derived units, all based on the total weight of the polymer;

D. The elastomer composition of any preceding embodiment A to C or any combination thereof, wherein the copolymer has an isotactic propylene triad tacticity of from 65 to 95%;

E. The elastomer composition of any preceding embodiment A to D or any combination thereof, wherein the copolymer has a tacticity index of from 6 to 8;

F. The elastomer composition of any preceding embodiment A to E or any combination thereof, wherein the blend comprises from 3 to 6 phr of the copolymer;

G. The elastomer composition of any preceding embodiment A to F or any combination thereof, wherein the ethylene-propylene polymer further comprises an additional $C_4$ to $C_{20}$ alpha-olefin derived unit present in an amount of not more than 25 wt %, or not more than 15 wt %, or not more than 10 wt % of the total weight of the polymer;

H. The elastomer composition of any preceding embodiment A to F or any combination thereof, wherein the ethylene-propylene polymer comprises zero weight percent of any additional $C_4$ to $C_{20}$ alpha-olefin derived unit;

I. The elastomer composition of any preceding embodiment A to H or any combination thereof, wherein the halobutyl rubber is selected from bromobutyl rubber, chlorobutyl rubber and mixtures thereof;

J. The elastomer composition of any preceding embodiment A to I or any combination thereof, wherein the cure system comprises less than 2 phr sulphur and/or wherein cure system comprises metal oxide;

K. The elastomer composition of any preceding embodiment A to J or any combination thereof, wherein the cure system comprises from 1 to 5 phr zinc oxide, from 0.4 to 0.8 phr sulfur and from 2 to 5 phr accelerators;

L. A vulcanizate obtained by curing the elastomer composition of any preceding embodiment A to K or any combination thereof;

M. An article comprising the vulcanizate of embodiment L;

N. The article of embodiment M wherein the halobutyl rubber comprises chlorobutyl and the article is a tire inner tube; and O. The article of embodiment M wherein the halobutyl rubber comprises bromobutyl and the article is a tire innerliner.

EXAMPLES

The abbreviations in appended Table 1 are used in the examples. In the examples below, the following compounding procedures were used. A BANBURY 1-liter laboratory mixer was used with a recommended fill factor of 75% for the first pass, 70% for the final pass. For the first pass, the mixer was set at 80 rpm, the ram pressure at 410 kPa (60 psi), and the chamber temperature at 50° C. After running a warm-up batch, the rubber(s) was added, the ram lowered, two-thirds of the carbon black was added at 30 seconds, and the remaining carbon black, oils, and any other powders added at 60 seconds. All compounds had a drop temperature of 145° C. and a mix time target of 5 minutes (300 seconds). At the end of the first stage, the compound temperature, mix time, batch weight, and any available power integrator data (energy) were recorded.

For the final mixing stage, the mixer was set at 30-40 rpm, the ram pressure at 275 kPa (40 psi) and the chamber temperature at 40° C. After checking the first pass cut down weight, half of the first pass material, any powders, and then the remaining first pass material were added and the ram lowered. The drop temperature was 145° C. and the mix time target was 90 seconds but never exceeded two minutes maximum. At the end of the final stage, the compound temperature, mix time, batch weight, and any available power integrator data (energy) were recorded.

Cure times for compounded samples are typically set by measuring t90 with an MDR rheometer, +2 minutes (i.e., time to 90% of optimum cure state), at 160° C. For mill sheets, the compound was added to the mill, and 12 cross cuts were performed followed by 12 pig rolls, keeping the compound cool with a maximum dwell time on the mill of 5 minutes.

Exemplary compositions and comparative compositions were prepared to evaluate the effect of the ethylene-propylene copolymer as a processing aid on a) the processing properties of the uncured composition and b) the final properties of the cured composition for both chlorobutyl and bromobutyl based elastomeric compositions.

Table 1 below identifies the components used in the exemplary and comparative compositions.

TABLE 1

| Abbreviation | Description |
|---|---|
| CIIR | CHLOROBUTYL 1066 Rubber |
| BIIR | BROMOBUTYL 2222 Rubber |
| N660 | GPF Carbon Black |
| MgO | Magnesium Oxide |
| StA | Stearic Acid |
| EP | Ethylene-Propylene Copolymer—see below table 2 for properities |
| ZnO | Zinc Oxide |
| Nap | Naphthenic Oil |
| ZBEC | Zinc dibenzyldithiocarbamate |
| S | Sulfur |
| Tack | Hydrocarbon resin—ESCOREZ 1102 from ExxonMobil Chemical |
| HA | Homogenizing Agent |
| MBTS | Mercaptobenzothiazole Disulfide |

The ethylene-propylene copolymer used to prepare the elastomeric composition has the following properties:

TABLE 2

| EP Copolymer Composition and Rheology* | | | | |
|---|---|---|---|---|
| $C_2$ (wt %) | $C_3$ (wt %) | Vicat S.P. (° C.) | MFR (dg/min) | Tensile Set (%) |
| 16 | 84 | 59 | 3 | 13 |

*VISTAMAXX 6102 available from ExxonMobil Chemical Company (Houston, Tx)

Chlorobutyl Compositions: While not exclusively used for tire inner tube compounds, a large percentage of chlorobutyl rubber is used for preparing tire inner tubes compositions. The use of the copolymer was evaluated using a formulary based on a model tire inner tube compound (model formulations can be found at www.butylrubber.com). The copolymer was added at 0 phr (control/comparative), 3 phr, and 6 phr. The compositions prepared are set forth in Table 3; all amounts shown in Table 3 are based on parts per hundred of rubber. The properties of both the uncured and cured composition are shown in Table 4. The test methods used are described earlier in this disclosure.

TABLE 3

| Component | 1 | 2 | 3 |
|---|---|---|---|
| CIIR | 100 | 100 | 100 |
| N660 | 75.00 | 75.00 | 75.00 |
| EP | 0 | 3.00 | 6.00 |
| MgO | 0.15 | 0.15 | 0.15 |
| StA | 1.00 | 1.00 | 1.00 |
| Nap | 25.00 | 25.00 | 25.00 |
| ZnO | 5.00 | 5.00 | 5.00 |
| ZBEC | 2.00 | 2.00 | 2.00 |
| S | 0.50 | 0.50 | 0.50 |

TABLE 4

|  | 1 | 2 | 3 |
|---|---|---|---|
| Composition | | | |
| CIIR, phr | 100.00 | 100.00 | 100.00 |
| EP-1, phr | 0 | 3.00 | 6.00 |
| Compounding Properties | | | |
| ML 1 + 4 @ 100° C., MU | 47 | 46 | 47 |
| Mooney Scorch (135° C.) | 9.5 | 9.8 | 10.6 |
| MDR Rheometer: 160° C. | | | |
| Minimum Torque, dN · m | 1.5 | 1.4 | 1.5 |
| Maximum Torque, dN · m | 6.7 | 6.4 | 6.2 |
| Scorch Time (ts2), minutes | 1.9 | 2.0 | 2.1 |
| Cure Time (tc90), minutes | 6.6 | 7.1 | 7.1 |
| Garvey Die Extrusion | | | |
| Shrinkage, % | 2.8 | 5.4 | 5.6 |
| Aged Fatigue to Fail (Aged at 125° C./3 days) | | | |
| Average cycles, kcycles | 6.2 | 10.6 | 11.1 |
| Original Stress Strain Properties | | | |
| 100% Modulus, MPa | 1.6 | 1.5 | 1.5 |
| 300% Modulus, MPa | 6.4 | 6.4 | 6.4 |
| Tensile Strength, MPa | 9.0 | 9.2 | 9.0 |
| Elongation at Break, % | 430 | 450 | 460 |
| Hardness, Shore A | 45 | 46 | 45 |
| Aged Stress Strain Properties (Aged at 125° C./7 days) | | | |
| 100% Modulus, MPa | 3.6 | 3.4 | 3.5 |
| Tensile Strength, MPa | 9.6 | 9.7 | 9.4 |
| Elongation at Break, % | 280 | 280 | 300 |
| Hardness, Shore A | 67 | 67 | 65 |

From the results identified in Table 4, it is evident that addition of the copolymer according to an embodiment leads to an improvement in higher Mooney scorch values, faster shrinkage (better long term dimensional stability of the produced article), no impact on original (unaged) mechanical properties, and improved aged mechanical and fatigue properties.

Bromobutyl Compositions: A large percentage of bromobutyl rubber is used for preparing tire innerliner compositions. The use of the ethylene-propylene copolymer was evaluated using a formulary based on a model tire innerliner compound. The copolymer was added at 0 phr (control/comparative), 3 phr, and 6 phr. The compositions prepared are set forth in Table 5 (all component amounts are in phr), and compound property data are summarized in Table 6, both appended below.

TABLE 5

| Component | 4 | 5 | 6 |
|---|---|---|---|
| BIIR | 100 | 100 | 100 |
| N660 | 60.00 | 60.00 | 60.00 |
| EP | 0 | 3.00 | 6.00 |
| Tack | 4.00 | 4.00 | 4.00 |
| StA | 1.00 | 1.00 | 1.00 |
| Nap | 8.00 | 8.00 | 8.00 |
| HA | 6.00 | 6.00 | 6.00 |
| ZnO | 1.00 | 1.00 | 1.00 |
| MBTS | 1.25 | 1.25 | 1.25 |
| S | 0.50 | 0.50 | 0.50 |

TABLE 6

| Property | 4 | 5 | 6 |
|---|---|---|---|
| Composition | | | |
| BIIR, phr | 100.00 | 100.00 | 100.00 |
| EP-1, phr | 0 | 3.00 | 6.00 |
| Compounding Properties | | | |
| ML 1 + 4 @ 100° C., MU | 55 | 54 | 53 |
| Mooney Scorch (135° C.) | 38.9 | 40.6 | 41.4 |
| MDR Rheometer: 160° C. | | | |
| Minimum Torque, dN · m | 1.3 | 1.4 | 1.3 |
| Maximum Torque, dN · m | 5.2 | 5.4 | 4.9 |
| Scorch Time (ts2), minutes | 5.4 | 5.7 | 5.8 |
| Cure Time (tc90), minutes | 9.1 | 9.6 | 9.1 |
| Green Strength | | | |
| Green Strength at 100%, N/mm$^2$ | 0.57 | 0.64 | 0.68 |
| Garvey Die Extrusion | | | |
| Shrinkage, % | 3.8 | 5.0 | 5.1 |
| Original Stress Strain Properties | | | |
| 100% Modulus, MPa | 1.0 | 1.1 | 1.1 |
| 300% Modulus, MPa | 3.4 | 4.0 | 3.8 |
| Tensile Strength, MPa | 8.6 | 9.5 | 9.4 |
| Elongation at Break, % | 810 | 760 | 760 |
| Hardness, Shore A | 42 | 44 | 41 |
| Aged Stress Strain Properties (Aged at 125° C./7 days) | | | |
| 100% Modulus, MPa | 2.2 | 2.2 | 2.0 |
| 300% Modulus, MPa | 6.3 | 6.2 | 5.9 |
| Tensile Strength, MPa | 7.9 | 7.8 | 7.6 |
| Elongation at Break, % | 460 | 470 | 490 |
| Hardness, Shore A | 60 | 60 | 60 |
| Original Fatigue to Failure | | | |
| Average cycles, kcycles | 86 | 162 | 166 |
| Aged Fatigue to Failure (Aged at 125° C./3 days) | | | |
| Average cycles, kcycles | 49 | 80 | 52 |
| De-Mattia Crack Growth | | | |
| Original (at 200 kcycles), mm | 9.4 | 6.0 | 7.4 |
| Aged 125° C./3 days (at 200 kcycles), mm | 12.3 | 10.3 | 10.3 |

From the results illustrated in Table 6, it is evident that addition of the copolymer according to an embodiment leads to an improvement in higher Mooney scorch values, faster shrinkage (better long term dimensional stability of the produced article), no impact on original (unaged) mechanical properties, improved aged mechanical and fatigue properties, and improved original and aged crack growth properties.

All patents, patent publications, test procedures, and other documents cited herein, including priority documents, are fully incorporated by reference to the extent such disclosure is not inconsistent with this invention and for all jurisdictions in which such incorporation is permitted.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the invention, including all features which would be treated as equivalents thereof by those skilled in the art to which the invention pertains.

What is claimed is:

1. An elastomer composition comprising a blend of:
   from 70 to 100 phr of a halobutyl rubber;
   a cure system comprising 0.1 to 2 phr sulphur and 2 to 5 phr accelerators; and
   from 1 to less than 10 phr of a saturated ethylene-propylene copolymer comprising at least 60 wt % propylene-derived units, and at least 6 wt % ethylene-derived units, based on the total weight of the copolymer, wherein the copolymer has isotactic polypropylene crystallinity, a melting point equal to or less than 110° C., a heat of fusion from 5 J/g to 50 J/g, an isotactic propylene triad tacticity of from 65 to 95%, and a Mooney viscosity ML (1+4) at 100° C. in the range of 40 to 60;
   wherein the composition has a Mooney viscosity ML (1+4) at 100° C. less than 55.

2. The elastomer composition of claim 1, wherein the copolymer comprises from 75 to 94 wt % of the propylene-derived units.

3. The elastomer composition of claim 1, wherein the copolymer comprises from 6 to 30 wt % of the ethylene-derived units.

4. The elastomer composition of claim 1, wherein the copolymer has a tacticity index of from 6 to 8.

5. The elastomer composition of claim 1, wherein the blend comprises from 3 to 6 phr of the copolymer.

6. The elastomer composition of claim 1, wherein the halobutyl rubber is selected from bromobutyl rubber, chlorobutyl rubber and mixtures thereof.

7. The elastomer composition of claim 1, further comprising a filler selected from carbon black, modified carbon black, silica, precipitated silica, and blends thereof.

8. The elastomer composition of claim 1, further comprising processing oil, resin, or a combination thereof.

9. The elastomer composition of claim 1, wherein the cure system comprises metal oxide.

10. The elastomer composition of claim 1, wherein the cure system comprises from 1 to 5 phr zinc oxide, from 0.4 to 0.8 phr sulfur and from 2 to 5 phr accelerators.

11. The vulcanizate obtained by curing the elastomer composition of claim 1.

12. An article comprising the vulcanizate of claim 11.

13. The article of claim 12, wherein the halobutyl rubber comprises chlorobutyl and the article is a tire inner tube.

14. The article of claim 12, wherein the halobutyl rubber comprises bromobutyl and the article is a tire innerliner.

15. A process for making a molded article, the process comprising:
    melt mixing the elastomeric composition of claim 1;
    shaping the mixture into a green article; and
    curing the green article to vulcanize the halobutyl rubber.

16. The process of claim 15, wherein the green article comprises an innerliner and further comprising assembling the innerliner in a tire build, wherein the innerliner is cured in the tire build.

17. The elastomer composition of claim 1, wherein the blend comprises from 5 to 50 phr of at least one processing aid, the processing aid selected from polyolefin copolymer plastomers, polybutene process oils, paraffinic oils, naphthenic oils, and aromatic oils.

* * * * *